United States Patent
Bainbridge et al.

(10) Patent No.: US 6,885,613 B1
(45) Date of Patent: Apr. 26, 2005

(54) APPARATUS FOR MONITORING A SOLDER WAVE

(75) Inventors: Andrew Bainbridge, Oldham (GB); Patrick John McWiggin, Lancs (GB)

(73) Assignee: Circuitmaster Designs Limited, Rochdale (GB)

( * ) Notice: Subject to any disclaimer, the term of this patent is extended or adjusted under 35 U.S.C. 154(b) by 219 days.

(21) Appl. No.: 10/110,857

(22) PCT Filed: Oct. 19, 2000

(86) PCT No.: PCT/GB00/04018

§ 371 (c)(1),
(2), (4) Date: Apr. 18, 2002

(87) PCT Pub. No.: WO01/32344

PCT Pub. Date: May 10, 2001

(30) Foreign Application Priority Data

Oct. 30, 1999 (GB) .......................................... 99254760

(51) Int. Cl.[7] .......................... G01N 19/00; H05K 3/34; G04B 47/00
(52) U.S. Cl. ..................... 368/10; 73/865.9; 228/180.1; 228/219
(58) Field of Search ............................. 368/1, 10, 110, 368/113; 73/865.9; 228/180.9, 219

(56) References Cited

U.S. PATENT DOCUMENTS

| | | | |
|---|---|---|---|
| 4,180,199 A | | 12/1979 | O'Rourke et al. |
| 4,383,494 A | | 5/1983 | Schillke et al. |
| 5,023,848 A | | 6/1991 | Frey et al. |
| 5,388,468 A | | 2/1995 | Sasson |
| 5,533,663 A | | 7/1996 | Massini, Jr. et al. |
| 5,538,175 A | * | 7/1996 | Massini et al. ............. 228/102 |
| 5,767,424 A | | 6/1998 | Breunsbach et al. |
| 6,085,960 A | * | 7/2000 | Kim et al. ................... 228/37 |
| 6,142,357 A | * | 11/2000 | Howell ........................ 228/39 |

FOREIGN PATENT DOCUMENTS

DE 199 00 599 A1 1/1999

* cited by examiner

Primary Examiner—Vit W. Miska
(74) Attorney, Agent, or Firm—Wallenstein Wagner & Rockey, Ltd.

(57) ABSTRACT

There is disclosed apparatus for monitoring a solder wave comprising a board of insulating material simulating a printed circuit board, an array of spaced electrical contact elements on the underside of the board across the entire width thereof, means for measuring the dwell time of each contact in the wave as the board is conveyed over the wave, and means for displaying the measured dwell times to show the contact area and time.

7 Claims, 1 Drawing Sheet

APPARATUS FOR MONITORING A SOLDER WAVE

This Application is a U.S. National filing under §371 of International Application No. PCT/GB/00/04018, filed Oct. 19, 2000, claiming priority from British Appln. No. GB 9925760.2, filed Oct. 30, 1999 (which is hereby incorporated by reference).

This invention concerns apparatus for monitoring a solder wave of the kind over which printed circuit boards having components inserted thereon are conveyed to form soldered connections between the components and the circuitry.

BACKGROUND OF THE INVENTION

It is important that the dwell time, which is to say the time for which the board is in contact with the solder, is within critical limits. It must be sufficient to ensure proper bonding but not so long as to cause any thermal damage to the components.

Clearly the conveying means is readily controlled. The solder wave is maintained by pumping molten solder over a weir for example. Changes in the pump operation can have a significant effect on dwell time.

Various instruments for analysing solder wave parameters are known, but such have failed to simulate the traditional technique of passing a sheet of glass over the wave and observing the area of contact between the wave and the underside of the glass.

SUMMARY OF THE INVENTION

According to the present invention, there is provided apparatus for monitoring a solder wave comprising a board of insulating material simulating a printed circuit board, an array of spaced electrical contact elements on the underside of the board across the entire width thereof means for measuring the dwell time of each contact in the wave as the board is conveyed over the wave, and means for displaying the measured dwell times to show the contact area and time.

The board may carry its own power supply.

A conducting strip may be provided on the underside of the board and extend in the direction of travel to provide an electrical connection with the wave to complete a circuit as each contact passes through the wave.

The board may carry a transmitter to transmit the measured dwell times for display on a remote PC or similar.

BRIEF DESCRIPTION OF THE DRAWINGS

The invention will be further apparent from the following description with reference to the several figures of the accompanying drawing which shows, by way of example only one form of apparatus embodying same.

Of the drawings.

DETAILED DESCRIPTION

Figure 1:
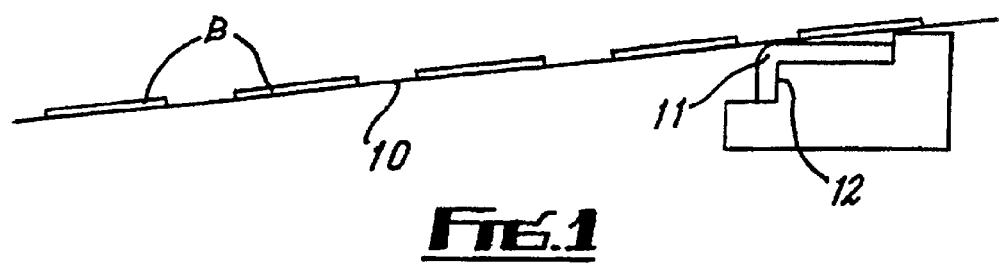
FIG. 1 shows a diagrammatic side elevation of a soldering machine incorporating a solder wave.
Figure 2:
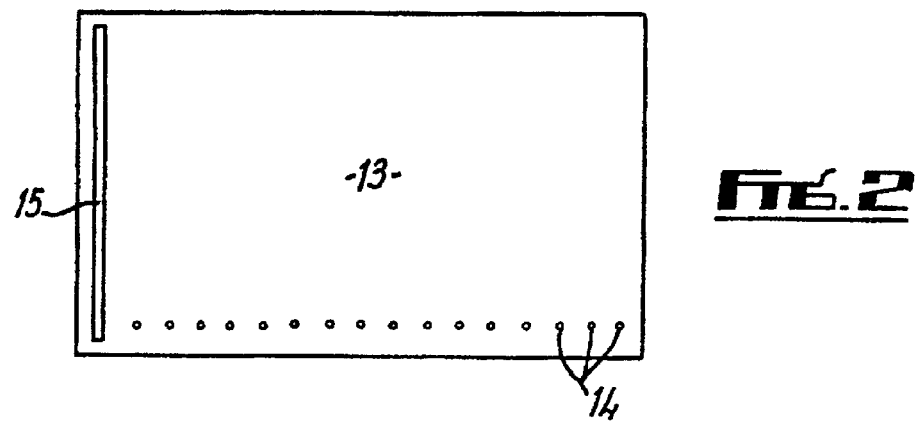
FIG. 2 shows a plan view of the underside of the apparatus of the invention.
Figure 3:
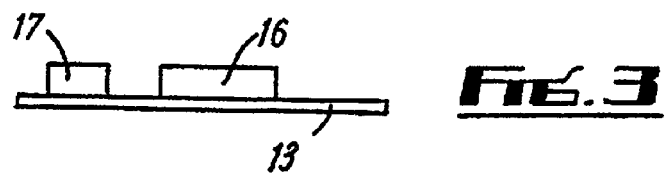
FIG. 3 shows a side view of the apparatus of the invention.

Referring first to FIG. 1, it will be seen that the soldering machine comprises an inclined conveyor 10 which carries printed circuit boards B over a solder wave 11 formed by molten solder which is circulated by pump means (not shown) over a weir 12.

The apparatus of the invention comprises a board 13 of insulating material which simulates a printed circuit board and which may be sent over the solder wave 11 by the conveyor 10.

On the underside of the board 13 are a plurality of electrical contacts 14 preferably of titanium spaced from one another over the entire width of the board. Also on the underside of the board is an electrically conducting strip 15 extending in the direction of travel to complete a circuit as each contact 14 passes through the wave 11.

An electronic module 16 on the upper side of the board 13 measures the dwell time of each contact 14 in the wave 11 as the board 13 passes over the wave.

Figure 4:
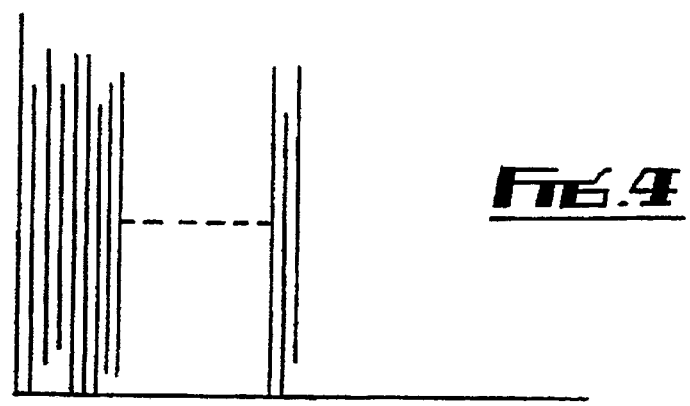
FIG. 4 shows a typical display generated by the apparatus of the invention.

The measured values are forwarded by a transmitter 17 to a receiver (not shown) connected to a PC which displays them in the form of a bar chart (see FIG. 4) whose envelope approximates to the area of contact between the board 13 and wave 11.

The chart may be analysed to enable the machine to be adjusted to operate in a desired manner.

It will be appreciated that it is not intended to limit the invention to the above example only, many variations, such as might readily occur to one skilled in the art, being possible, without departing from the scope thereof as defined by the appended claims.

Thus the dwell times need not be displayed in the form of a bar chart—they may be displayed in numerically or in other graphical form.

What is claimed is:

1. Apparatus for monitoring a solder wave comprising:
   a board of insulating material simulating a printed circuit board;
   a many-membered array comprising of spaced electrical contact elements on the underside of the board across the entire width thereof;
   means for measuring the dwell time of each contact in the wave as the board is conveyed over the wave;
   and means arranged to display a graphical visual representation of dwell times in a form which indicates the shape of the contact area between the board and the solder wave.

2. Apparatus according to claim 1 wherein the dwell times are displayed in the form of a bar chart.

3. Apparatus according to claim 1 wherein the board carries its own power supply.

4. Apparatus according to claim 1 wherein a conducting strip is provided on the underside of the board and extends in the direction of travel to provide an electrical connection with the wave to complete a circuit as each contact passes through the wave.

5. Apparatus according to claim 1 wherein the board carries a transmitter to transmit the measured dwell times for display on a remote PC or similar.

6. Apparatus as claimed in claim 1 in which the contact elements comprise a linear array.

7. Apparatus according to claim 1 wherein the dwell times are displayed in a chart having an envelope approximating the contact area between the board and the solder wave.

* * * * *

UNITED STATES PATENT AND TRADEMARK OFFICE
CERTIFICATE OF CORRECTION

PATENT NO. : 6,885,613 B1
DATED : April 26, 2005
INVENTOR(S) : Andrew Bainbridge and Patrick John McWiggin It is certified that error appears in the above-identified patent and that said Letters Patent is hereby corrected as shown below:

Column 2,
Line 39, delete "of".

Signed and Sealed this

Fourth Day of October, 2005

JON W. DUDAS
*Director of the United States Patent and Trademark Office*